(12) United States Patent
Qi et al.

(10) Patent No.: US 9,913,109 B2
(45) Date of Patent: Mar. 6, 2018

(54) APPARATUS, SYSTEM AND METHOD OF NAN MULTICAST GROUP

(71) Applicant: INTEL IP CORPORATION, Santa Clara, CA (US)

(72) Inventors: Emily H. Qi, Gig Harbor, WA (US); Elad Oren, Tel Aviv (IL); Minyoung Park, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/392,112

(22) Filed: Dec. 28, 2016

(65) Prior Publication Data
US 2017/0111773 A1 Apr. 20, 2017

Related U.S. Application Data

(63) Continuation of application No. 14/670,621, filed on Mar. 27, 2015, now Pat. No. 9,602,998.

(60) Provisional application No. 62/105,818, filed on Jan. 21, 2015.

(51) Int. Cl.
| | |
|---|---|
| *H04W 4/08* | (2009.01) |
| *H04W 8/00* | (2009.01) |
| *H04L 29/06* | (2006.01) |
| *H04W 12/04* | (2009.01) |

(52) U.S. Cl.
CPC ........... *H04W 4/08* (2013.01); *H04L 65/4076* (2013.01); *H04W 8/005* (2013.01); *H04W 12/04* (2013.01)

(58) Field of Classification Search
CPC ..... H04W 8/005; H04W 48/16; H04W 12/04; H04W 4/08; H04W 56/001; H04W 92/18
USPC ................ 455/39, 445, 518, 519, 500, 517, 455/456.1-457, 41.1-41.3, 426.1, 426.2, 455/422.1, 403, 550.1, 466, 414.1-414.4; 370/310, 311, 312, 313, 324, 343, 340, 370/341, 466, 408, 389
See application file for complete search history.

(56) References Cited

U.S. PATENT DOCUMENTS

| | | | |
|---|---|---|---|
| 8,687,546 B2 | 4/2014 | Gong et al. | |
| 8,824,440 B2 | 9/2014 | Ghosh et al. | |
| 8,971,229 B1 | 3/2015 | Yenganti et al. | |
| 9,060,293 B1 | 6/2015 | Vivanco et al. | |
| 9,143,979 B1 | 9/2015 | Lambert | |
| 9,544,754 B1 * | 1/2017 | Lambert | ............... H04W 8/005 |
| 2005/0249227 A1 | 11/2005 | Wang et al. | |
| 2008/0069021 A1 | 3/2008 | Chhabra | |
| 2008/0130603 A1 | 6/2008 | Wentink et al. | |

(Continued)

OTHER PUBLICATIONS

Office Action for U.S. Appl. No. 14/670,513 dated Jan. 12, 2017, 29 pages.

(Continued)

*Primary Examiner* — Keith Ferguson
(74) *Attorney, Agent, or Firm* — Shichrur & Co.

(57) ABSTRACT

Some demonstrative embodiments include apparatuses, systems and/or methods of communicating traffic to a plurality of wireless devices. For example, an apparatus may include logic and circuitry configured to cause a Neighbor Awareness Networking (NAN) device to communicate one or more discovery messages during at least one Discovery Window (DW) of a NAN cluster including the NAN device; and communicate data within a data link group after the DW, the data link group including the NAN device and one or more NAN devices of the NAN cluster.

34 Claims, 4 Drawing Sheets

(56) References Cited

U.S. PATENT DOCUMENTS

| | | |
|---|---|---|
| 2011/0093536 A1 | 4/2011 | Wentink |
| 2012/0082127 A1 | 4/2012 | Wu et al. |
| 2012/0134349 A1 | 5/2012 | Jung et al. |
| 2013/0121256 A1 | 5/2013 | Backes |
| 2014/0056220 A1 | 2/2014 | Poitau et al. |
| 2014/0064160 A1 | 3/2014 | Verger et al. |
| 2014/0126417 A1 | 5/2014 | Kang et al. |
| 2015/0016322 A1 | 1/2015 | Yenganti et al. |
| 2015/0109961 A1 | 4/2015 | Patil et al. |
| 2015/0109981 A1 | 4/2015 | Patil et al. |
| 2015/0139203 A1 | 5/2015 | Miryala et al. |
| 2015/0172391 A1 | 6/2015 | Kasslin et al. |
| 2015/0172757 A1 | 6/2015 | Kafle et al. |
| 2015/0181521 A1 | 6/2015 | Kwon et al. |
| 2015/0319675 A1 | 11/2015 | Park et al. |
| 2016/0100361 A1 | 4/2016 | Zheng et al. |
| 2016/0119738 A1 | 4/2016 | Hampel et al. |
| 2016/0127459 A1 | 5/2016 | Qi |
| 2016/0142994 A1 | 5/2016 | Luo et al. |
| 2016/0157089 A1 | 6/2016 | Qi et al. |
| 2016/0157193 A1 | 6/2016 | Qi et al. |
| 2016/0165653 A1 | 6/2016 | Liu et al. |
| 2016/0174136 A1 | 6/2016 | Patil et al. |
| 2016/0205529 A1 | 7/2016 | Oren et al. |
| 2016/0205616 A1 | 7/2016 | Oren et al. |
| 2016/0212606 A1 | 7/2016 | Qi et al. |

OTHER PUBLICATIONS

Office Action for U.S. Appl. No. 14/670,503 dated Mar. 29, 2017, 27 pages.

Notice of Allowance for U.S. Appl. No. 14/670,503, dated Jun. 14, 2017, 18 pages.

Office Action for U.S. Appl. No. 14/670,513 dated Jul. 11, 2017, 29 pages.

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

Wi-Fi Alliance, Wi-Fi Peer-to-Peer (P2P) Technical Specification Version 1.5, Aug. 4, 2014, 183 pages.

Office Action for U.S. Appl. No. 14/670,503, dated Oct. 26, 2016, 40 pages.

Office Action for U.S. Appl. No. 14/670,621, dated Jun. 15, 2016, 14 pages.

\* cited by examiner

APPARATUS, SYSTEM AND METHOD OF NAN MULTICAST GROUP

CROSS REFERENCE

This Application is a Continuation Application of U.S. patent application Ser. No. 14/670,621, filed on Mar. 27, 2015, which claims the benefit of and priority from U.S. Provisional Patent Application No. 62/105,818 entitled "Apparatus, System and Method of Communicating in a Data Link Group", filed Jan. 21, 2015, the entire disclosures of which are incorporated herein by reference.

TECHNICAL FIELD

Embodiments described herein generally relate to communicating in a data link group.

BACKGROUND

In some wireless communication networks, communication may be performed during discovery windows (DWs).

Stations may be allowed to transmit a discovery frame during a DW, in order to enable the stations to discover other devices or services that are running on the other devices.

Transmissions may be performed during the DW based on a contention mechanism.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
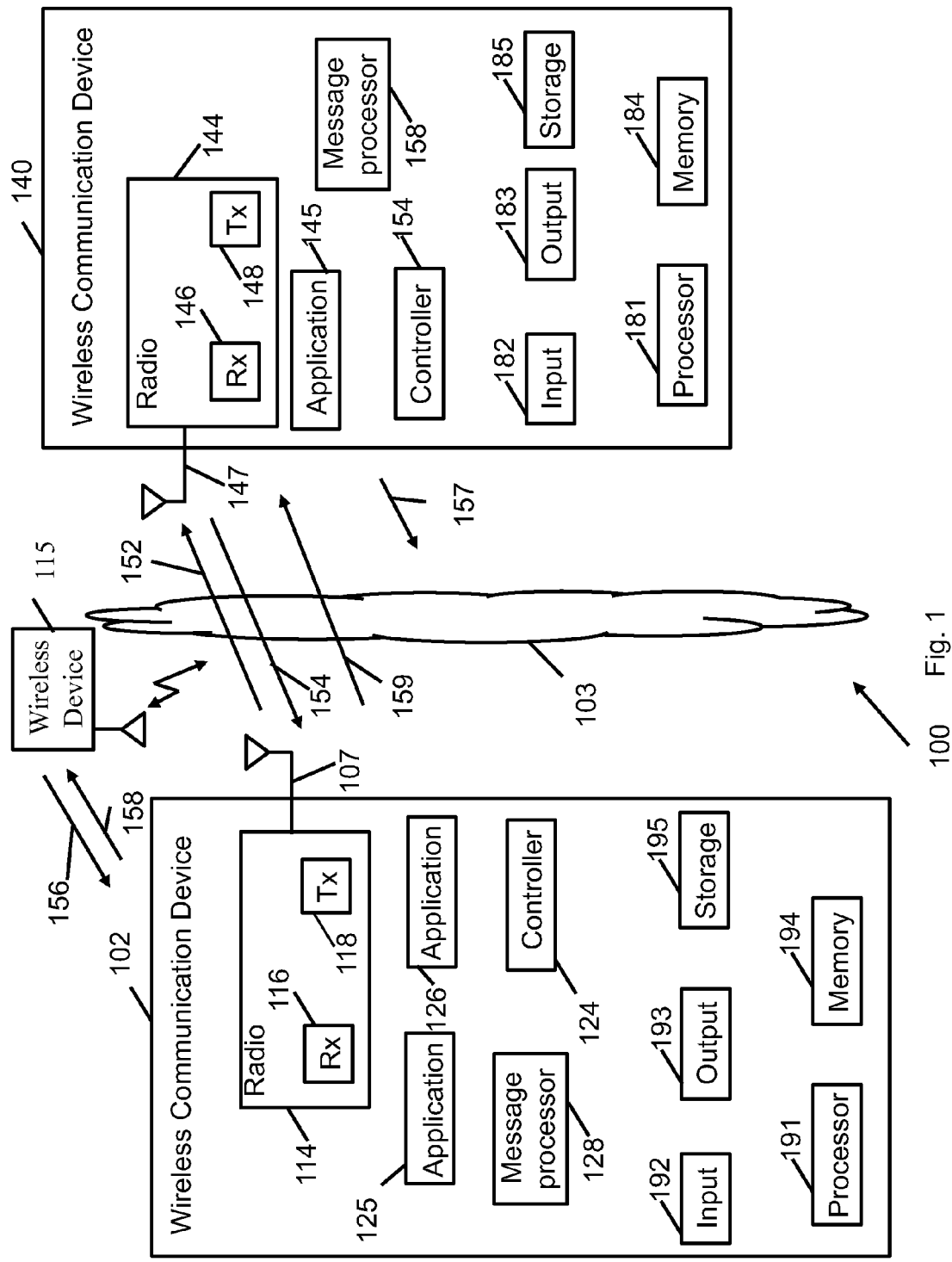
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing Wireless Fidelity (WiFi) Alliance (WFA) Specifications (including WFA Neighbor Awareness Networking (NAN) Specification) and/or future versions and/or derivatives thereof, devices and/or networks operating in accordance with existing WFA Peer-to-Peer (P2P) specifications (*WiFi P2P technical specification, version* 1.2, 2012) and/or future versions and/or derivatives thereof, devices and/or networks operating in accordance with existing Wireless-Gigabit-Alliance (WGA) specifications (Wireless Gigabit Alliance, Inc *WiGig MAC and PHY Specification Version* 1.1, April 2011, Final specification) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11*: Wireless LAN Medium Access Control (MAC) and Physical Layer (PHY) Specifications*, Mar. 29, 2012; IEEE802.11ac-2013 ("*IEEE P*802.11*ac*-2013*, IEEE Standard for Information Technology—Telecommunications and Information Exchange Between Systems—Local and Metropolitan Area Networks—Specific Requirements—Part* 11*: Wireless LAN Medium Access Control (MAC) and Physical Layer (PHY) Specifications—Amendment* 4*: Enhancements for Very High Throughput for Operation in Bands below* 6 *GHz*", December, 2013); IEEE 802.11ad ("*IEEE P*802.11*ad*-2012*, IEEE Standard for Information Technology—Telecommunications and Information Exchange Between Systems—Local and Metropolitan Area Networks—Specific Requirements—Part* 11*: Wireless LAN Medium Access Control (MAC) and Physical Layer (PHY) Specifications—Amendment* 3*: Enhancements for Very High Throughput in the* 60 *GHz Band*", 28 Dec. 2012); and/or IEEE-802.11REVmc ("*IEEE* 802.11-*REVmc™/D*3.0*, June* 2014 *draft standard for Information technology—Telecommunications and information exchange between systems Local and metropolitan area networks Specific requirements; Part* 11*: Wireless LAN Medium Access Control (MAC) and Physical Layer (PHY) Specification*")) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102, 115 and/or 140.

In some demonstrative embodiments, wireless communication devices 102, 115 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD)

player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 115 may include, for example, one or more of a processor 191, an input unit 192, an output unit 193, a memory unit 194, and a storage unit 195; and/or device 140 may include, for example, one or more of a processor 181, an input unit 182, an output unit 183, a memory unit 184, and a storage unit 185. Devices 102 and/or 140 may optionally include other suitable hardware components and/or software components. In some demonstrative embodiments, some or all of the components of one or more of devices 102, 115 and/or 140 may be enclosed in a common housing or packaging, and may be interconnected or operably associated using one or more wired or wireless links. In other embodiments, components of one or more of devices 102, 115 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 115 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a millimeterWave (mmWave) frequency band, e.g., a 60 GHz frequency band, a Sub 1 Gigahertz (S1G) band, and/or any other frequency band.

In some demonstrative embodiments, devices 102, 115 and/or 140 may include one or more radios including circuitry and/or logic to perform wireless communication between devices 102, 115, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may be configured to communicate over a 2.4 GHz band, a 5 GHz band, a mmWave band, a S1G band, and/or any other band.

In some demonstrative embodiments, radios 114 and/or 144 may include circuitry and/or logic, modulation elements, demodulation elements, amplifiers, analog to digital and digital to analog converters, filters, and/or the like. In one example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable to transmit and/or receive wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102, 115 and/or 140 may form, and/or may communicate as part of, a wireless local area network (WLAN).

In some demonstrative embodiments, wireless communication devices 102, 115 and/or 140 may form, and/or may communicate as part of, a WiFi network.

In some demonstrative embodiments, wireless communication devices 102, 115 and/or 140 may form, and/or may communicate as part of, a WiFi Direct (WFD) network, e.g., a WiFi direct services (WFDS) network, and/or may perform the functionality of one or more WFD devices.

In one example, device 102, 115 and/or device 140 may include, or may perform the functionality of a WiFi Direct device.

In some demonstrative embodiments, wireless communication devices 102, 115 and/or 140 may be capable of performing awareness networking communications, for example, according to an awareness protocol, e.g., a WiFi aware protocol, and/or any other protocol, e.g., as described below.

In some demonstrative embodiments, wireless communication devices 102, 115 and/or 140 may include an awareness networking device and/or station.

In some demonstrative embodiments, wireless communication devices 102, 115 and/or 140 may be capable of forming, and/or communicating as part of, a Neighbor Awareness Networking (NAN) network, e.g., a WiFi NAN, and/or may perform the functionality of one or more NAN devices.

In some demonstrative embodiments, wireless communication devices 102, 115 and/or 140 may include a NAN device and/or station.

In other embodiments, wireless communication devices 102, 115 and/or 140 may include any other wireless devices.

In some demonstrative embodiments, wireless communication medium 103 may include a direct link, for example, a PTP link, e.g., a WiFi direct P2P link, for example, to enable direct communication between device 102 and device 140.

In some demonstrative embodiments, wireless communication devices 102, 115 and/or 140 may perform the functionality of WFD P2P devices. For example, devices 102, 115 and/or 140 may be able to perform the functionality of a P2P client device, and/or P2P group Owner (GO) device.

In other embodiments, wireless communication devices 102, 115 and/or 140 may form, and/or communicate as part of, any other network and/or perform the functionality of any other wireless devices or stations.

In some demonstrative embodiments, devices 102, 115 and/or 140 may include one or more applications configured to provide, share, and/or to use one or more services, e.g., a social application, a file sharing application, a media application and/or the like, for example, using an awareness network, NAN network, a PTP network, a P2P network, WFD network, or any other network.

In some demonstrative embodiments, device 102 may execute an application 125 and/or an application 126. In some demonstrative embodiments, device 140 may execute an application 145.

In some demonstrative embodiments, devices 102, 115 and/or 140 may be capable of sharing, showing, sending, transferring, printing, outputting, providing, synchronizing, and/or exchanging content, data, and/or information, e.g., between application 154 and applications 125 and/or 126.

In some demonstrative embodiments, devices 102, 115 and/or 140 may include a controller configured to control one or more functionalities of devices 102, 115 and/or 140, for example, one or more functionalities of communication, e.g., awareness networking communications, NAN communication and/or any other communication, between devices 102, 115 and/or 140 and/or other devices, and/or any other functionality, e.g., as described below. For example, device 102 may include a controller 124, and/or device 140 may include a controller 154.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154. Additionally or alternatively, one or more functionalities of controllers 124 and/or 154 may be implemented by logic, which may be executed by a machine and/or one or more processors, e.g., as described below. In one example, controllers 124 and/or 154 may include one or more processors having circuitry and/or logic to cause a device or a station, e.g., devices 102 and/or 140, to perform one or more functionalities, e.g., as described herein.

In one example, controller 124 may include one or more processors including circuitry and/or logic to cause a wireless device, e.g., device 102, and/or a wireless station, e.g., a wireless STA implemented by device 102, to perform one or more operations, communications and/or functionalities, e.g., as described herein.

In one example, controller 154 may include one or more processors including circuitry and/or logic to cause a wireless device, e.g., device 140, and/or a wireless station, e.g., a wireless STA implemented by device 140, to perform one or more operations, communications and/or functionalities, e.g., as described herein.

In some demonstrative embodiments, devices 102 and/or 115 may include a message processor 128 configured to generate, process and/or access one or messages communicated by devices 102 and/or 115.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 104.

In some demonstrative embodiments, devices 102, 115 and/or 140 may perform the functionality of a device or station, for example, an awareness networking device and/or station, a NAN device and/or station, a WiFI device and/or station, a WFD device and/or station, a WLAN device and/or station, and/or any other device and/or station, capable of discovering other devices and/or stations according to a discovery protocol and/or scheme.

In some demonstrative embodiments, radios 114 and/or 144 may communicate over wireless communication medium 103 according to an awareness networking scheme, for example, a discovery scheme, for example, a NAN discovery scheme, or any other awareness networking and/or discovery scheme, e.g., as described below.

In some demonstrative embodiments, the awareness networking scheme, e.g., the NAN scheme, may enable applications to discover services in their close proximity. For example, the NAN technology may be a low power service discovery, which may, for example, scale efficiently, e.g., in dense Wi-Fi environments.

In some demonstrative embodiments, a device, e.g., device 102, device 115, and/or device 140, may include one or more blocks and/or entities to perform network awareness functionality. For example, devices 102, 115 and/or 140 may include a NAN MAC and/or a Discovery Engine (DE). In one example, controllers 124 and/or 154 may be configured to perform the functionality of the NAN MAC and/or the Discovery Engine. In another example, the functionality of the NAN MAC and/or the Discovery Engine may be performed by any other element and/or entity of devices 102, 115 and/or 140.

In some demonstrative embodiments, the awareness networking scheme may include a discovery scheme or protocol, e.g., as described below.

In some demonstrative embodiments, devices 102, 115 and/or 140 may perform a discovery process according to the awareness networking scheme, for example, to discover each other and/or to establish a wireless communication link, e.g., a directional and/or high throughput wireless communication link and/or any other link.

In some demonstrative embodiments, devices 102, 115 and/or 140 may be configured to enable time synchronization between device 102, device 115, device 140 and/or one or more other devices, e.g., performing the functionality of Wi-Fi stations (STAs), for example, such that STAs can discover each other more efficiently and/or quickly.

Some demonstrative embodiments are described below with respect to a NAN discovery scheme, and to NAN discovery frames of the NAN discovery scheme. However, in other embodiments, any other discovery scheme and/or discovery frames may be used.

In some demonstrative embodiments, the discovery scheme may include a plurality of contention-based discovery windows (DWs).

In some demonstrative embodiments, communication during the DWs may be configured to enable time synchronization between Wi-Fi stations (STAs), e.g., devices 102, 115 and/or 140, so that STAs can find each other more efficiently during a DW.

In some demonstrative embodiments, devices 102, 115 and/or 140 may be configured to communicate during the DWs.

In some demonstrative embodiments, devices of an awareness network, e.g. a NAN network, may form one or more clusters, e.g., in order to publish and/or subscribe for services.

In some demonstrative embodiments, devices 102, 115 and/or 140 may form an awareness cluster.

In some demonstrative embodiments, devices 102, 115 and/or 140 may belong to the same awareness cluster.

In some demonstrative embodiments, the awareness cluster may include a NAN cluster.

In some demonstrative embodiments, the NAN cluster may be defined by an Anchor Master (AM). In one example, the AM may include a NAN device, which has the highest rank in the NAN cluster. In other embodiments, the NAN cluster may be defined by any other device, for example, a master device, an anchor device, a manager device, and the like.

In some demonstrative embodiments, NAN data exchange may be reflected by service discovery frames (SDF), e.g., Publish, Subscribe and/or Follow-Up Service discovery frames (SDF). These frames may include, for example, public action frames, which may be sent by a device that wishes to publish a service/application, and/or to subscribe to a published service/application at another end.

In one example, one of devices 102, 115 and/or 140, e.g., device 102, may perform the functionality of an AM, a master device, an anchor device or a manger device, which may be configured to transmit one or more beacons. Another one of devices 102, 115 and/or 140, e.g., device 140, may be configured to receive and process the beacons.

In another example, devices 102, 115 and/or 140 may perform the functionality of NAN devices, e.g., belonging to a NAN cluster, which may share a common set of NAN parameters, for example, including a common NAN timestamp, and/or a common time period between consecutive discovery windows (DWs), e.g., as described below. The NAN timestamp may be communicated, for example, as part of a NAN beacon frame, which may be communicated in the NAN cluster. In one example, the NAN timestamp may include a Time Synchronization Function (TSF) value, for example, a NAN cluster TSF value, or any other value.

In some demonstrative embodiments, devices 102, 115 and/or 140 may be configured to discover one another over a predefined communication channel ("the social channel"). In one example, the Channel 6 in the 2.4 GHz band may be defined as the NAN social channel Any other channel may be used as the social channel.

In some demonstrative embodiments, devices 102, 115 and/or 140 may transmit the discovery frames, e.g., SDFs, during the plurality of DWs, e.g., over the NAN social channel In one example, devices 102, 115 and/or 140 may transmit the discovery frames to discover each other, for example, to enable using the one or more services provided by applications 125, 126 and/or 145.

In some demonstrative embodiments, devices 102, 115 and/or 140 may communicate during a DW according to a contention mechanism. For example, devices 102, 115 and/or 140 may check whether or not a wireless communication channel is unoccupied prior to an attempt to transmit a service discovery frame during the discovery window.

In some demonstrative embodiments, a device of devices 102, 115 and/or 140, e.g., device 102, may not transmit the discovery frame during the DW, e.g., if the channel is occupied. In some demonstrative embodiments, device 102 may transmit the discovery frame during the DW, e.g., if the channel is unoccupied.

In some demonstrative embodiments, the service discovery frame may be transmitted as a group addressed, e.g., broadcast or multicast, discovery frame. In other embodiments, the discovery frame may be transmitted as any other type of frame.

In some demonstrative embodiments, the service discovery frame may not require an acknowledgement frame. According to these embodiments, a transmitter of the discovery frame may not backoff a transmission of the service discovery frame.

In some demonstrative embodiments, the service discovery frame transmitted by device 102 during the DW may be configured to enable other devices and/or services that are running on other devices to discover services on device 102.

In some demonstrative embodiments, devices of system 100 may utilize availability information (also referred to as "further availability" information), e.g., in the form of an availability interval bitmap and/or a further availability map, for example, to allow a device of devices 102, 115 and/or 140, to advertise its availability, for example, in terms of at least one channel and one or more timeslots, during which the device may be available, e.g., in an active mode ("awake mode"), for example, to perform post NAN activities.

In one example, the availability information may be communicated as part of an availability attribute of the service discovery frame.

In some demonstrative embodiments, the availability attribute may include, for example, a 32-bit bitmap corresponding to 32 timeslots, e.g., each timeslot is 16 milliseconds (ms) long.

In one example, each bit of the 32-bit bitmap that is not zero may represent a time slot, during which a device sending the availability attribute is to be awake and available during the time slot to send and/or receive data.

In some demonstrative embodiments, it may be inefficient and/or disadvantageous to exchange data between awareness networking devices, for example, by forming a P2P link or another non-NAN link between the devices. For example, a first NAN device that wishes to exchange data with a second NAN device may send to the second NAN device an availability attribute to indicate the channels and the time slots, during which the first device is available to exchange data. The first and second NAN devices may then use a post-discovery method, for example, by using an infrastructure or a peer-to-peer (P2P) network to exchange the data.

In some demonstrative embodiments, devices 102, 115 and/or 140, may be configured to use an awareness networking protocol, for example, the NAN protocol, to exchange data, e.g., in addition to the exchanging of the service discovery frames, for example, even without the need to use a different connection mechanism, for example, even without using a connection via the infrastructure or the P2P network, e.g., as described below.

In some demonstrative embodiments, devices 102, 115 and/or 140 may use the further availability mechanism, e.g., as described above, for example, to coordinate one or more channels and/or time slots, in which devices 102, 115 and/or 140 may meet to exchange data traffic.

In some demonstrative embodiments, devices 102, 115 and/or 140 may be configured to exchange data via an awareness networking communication link ("data link"), for example, a NAN Data Link (NDL).

In some demonstrative embodiments, the data link may include a unicast data link to communicate unicast data e.g., unicast traffic. For example, the data link may be used to exchange data between a first device of a cluster, e.g., device 102, and a second device of the cluster, e.g., device 140.

In some demonstrative embodiments, the data link may include a multicast data link to communicate multicast data, e.g., multicast traffic. For example, the data link may be used to exchange data between a first device of a cluster, e.g., device 102, and one or more other devices of the cluster, e.g., devices 140 and/or 115.

In one example, a multicast NAN data link may be utilized, for example, to exchange multicast data between multi-player gaming applications, multi-user sharing application, and the like In some demonstrative embodiments, the data exchange via the data link may be performed between two devices, or more than two devices.

In some demonstrative embodiments, two or more devices of a cluster may form a data link group (also referred to as "data group").

In some demonstrative embodiments, a data link group may include more than one NAN device.

In some demonstrative embodiments, the data link group may include any logical group, which may be formed, for example, based on devices that share a specific application/service or some other common identifier within an awareness networking cluster.

In some demonstrative embodiments, all the devices in the data link group may belong to the same NAN cluster. For example, devices 102, 115 and/or 140 may belong to the same NAN cluster and may form one or more data link groups, e.g., as described below.

In some demonstrative embodiments, one or more data link groups, e.g., a single data link group or a plurality of data link groups, may be formed in a cluster. For example, devices 102, 115 and 140 may belong to the same NAN cluster, devices 102, 115, and 140 may form a first group, and/or devices 102, and 140 may form a second group.

In some demonstrative embodiments, devices 102, 115 and/or 140 may be configured to perform robust peer to peer data group formation and/or operation, e.g., as described below.

In some demonstrative embodiments, devices 102, 115 and/or 140 may be configured to form a group of devices, which may be able to setup a data link and/or transmit data to one another, e.g., as described below.

In some demonstrative embodiments, devices 102, 115 and/or 140 may be configured to communicate in a data link group, e.g., a NAN data link group (also referred to as "NAN data group"), and/or to perform flexible management of joining a group and/or leaving a data link group.

In some demonstrative embodiments, devices 102, 115 and/or 140 may be configured to communicate according to one or more data link group mechanisms and/or protocols, for example, to form a data link group, e.g., to form a NAN data link group, to join a data link group, e.g., to join a NAN data link group, to determine which devices are in the data link group, e.g., to determine which devices are in the NAN data link group, to leave the data link group, e.g., to leave the NAN data link group, and/or to terminate the data link group, e.g., to terminate the NAN data link group, e.g., as described below.

In some demonstrative embodiments, a NAN data group may be configured, for example, in compliance with a NAN protocol, e.g., as described below. In other embodiments, any other data link group may be configured with any other communication protocol.

In some demonstrative embodiments, a NAN data link group may include a group of NAN devices in a NAN cluster, which may be able to start a data link.

In some demonstrative embodiments, a NAN cluster may include multiple NAN data groups.

In some demonstrative embodiments, a NAN device may participate in one or more, e.g., multiple, NAN data groups.

In some demonstrative embodiments, a NAN device, which belongs to a NAN data group, may be configured to transmit a unicast frame to another NAN device, e.g., which belongs to the NAN data group.

In some demonstrative embodiments, the NAN device may be configured to transmit a group addressed frame, e.g., a multicast frame, to all devices in the NAN data group.

In some demonstrative embodiments, a NAN data group, e.g., each NAN data group, may be identified by a NAN data group identifier (ID).

In some demonstrative embodiments, the NAN data Group ID may have a length of 6 Octets, e.g., in a format similar to a format of a 6-Octet MAC address.

In other embodiments, the NAN data Group ID may include any other address, format and/or identifier.

In some demonstrative embodiments, a NAN data group may have a Coordinator. The Coordinator of the NAN data group may be configured to coordinate multicast traffic delivery, a power save schedule, data rates, security associations, and/or any other operation and/or functionality within the NAN data group.

In some demonstrative embodiments, the coordinator of the data link group may be predefined, or elected, for example, according to any suitable coordinator election criterion, algorithm, scheme and/or procedure.

In some demonstrative embodiments, the NAN data group may be a "Public" group, or a "Private" group, e.g., as described below.

In some demonstrative embodiments, a Public data link group may be accessible by and/or published to one or more devices, e.g., other than devices of the Public data link group.

In some demonstrative embodiments, a Private data link group may not be accessible to, and/or published to, e.g., hidden from, one or more devices, e.g., other than devices of the Private data link group.

In one example, communication between devices of the Private group may be encrypted. According to this example, the devices of the private group may utilize a group key to communicate within the private group.

In some demonstrative embodiments, a coordinator of the public group may be configured to announce the existence of the group, for example, by transmitting a NAN service discovery frame including the NAN Group ID, and/or group operation availability and information, e.g., as part of an Availability Attribute of the service discovery frame.

In some demonstrative embodiments, devices 102, 115 and/or 140 may communicate one or more discovery messages during at least one DW of a NAN cluster including devices 102, 115 and 140.

In one example, devices 102, 115 and/or 140 may communicate one or more service discovery frames (SDFs) during DWs of the NAN cluster.

In some demonstrative embodiments, devices 102, 115 and/or 140 may be configured to communicate data within a data link group, e.g., after the DW.

In some demonstrative embodiments, the data link group may include one or more NAN devices of the NAN cluster.

In some demonstrative embodiments, a device of devices 102, 115 and/or 140 may be configured to communicate data within the data link group after the DW.

In one example, a device of devices 102, 115 and/or 140 may be configured to communicate a unicast frame with a device of the data link group. For example, device 102 may communicate unicast data with device 115.

In another example, a device of devices 102, 115 and/or 140 may be configured to communicate a multicast frame with devices of the data link group. For example, device 102 may communicate a multicast data frame with device 115 and device 140.

In some demonstrative embodiments, devices 102, 115 and 140 may be configured to form the data link group.

In some demonstrative embodiments, a first device of devices 102, 115 and 140 may be configured to form a data link group between the first device and a second device of devices 102, 115 and 140.

In one example, devices 102, 115 and/or 140 may be configured to perform a formation procedure ("start procedure"), which may be configured to form and/or start a NAN data link group, e.g., as described below.

In some demonstrative embodiments, a NAN data group may be formed for example, by a NAN device ("the requesting NAN device"), which may discover another NAN device ("the peer NAN device"). For example, the peer NAN device may publish a service of an application at the peer NAN device, which is to be used by the requesting NAN device.

In some demonstrative embodiments, the requesting NAN device may initiate a formation of a data link group with the peer NAN device.

In some demonstrative embodiments, the requesting NAN device may transmit a message, e.g., a frame, ("the Join Request action frame") to the peer NAN device, for example, during a time slot and/or over a channel in accordance with the availability of the peer NAN device availability, e.g., as published by the peer NAN device.

In some demonstrative embodiments, the Join Request action frame may indicate a request to join a data link group.

In some demonstrative embodiments, the Join Request action frame may include capability information of the requesting NAN device.

In some demonstrative embodiments, the peer NAN device may transmit a frame ("the Join Response action frame") to the requesting NAN device, for example, in response to the Join Request action frame.

In some demonstrative embodiments, the Join Response action may include an indication on whether the request to join the data link group is accepted or rejected.

In some demonstrative embodiments, the Join Response action frame may include a Group ID of the data link group, and capability information of the peer NAN device, for example, if the Join Request is accepted.

In some demonstrative embodiments, the requesting NAN device and the peer NAN device may communicate a probe request frame, a probe response frame and/or any other frames and/or messages, for example, to exchange the capability information of the requesting NAN device and/or the peer NAN device, e.g., prior to the communication of the Join Request and/or Join Response frames.

In some demonstrative embodiments, a group key of the data link group may be generated, for example, during probe request, probe response, join request and/or join response message exchange between the requesting NAN device and the peer NAN device, for example, if a secure and/or private data link group is to be formed.

In some demonstrative embodiments, controller 124 may cause device 102 to request to from a data link group between device 102 and device 140, e.g., as described below.

In one example, controller 124 may cause device 102 to from a data link group between device 102 and device 140, for example, to exchange data and/or to use a service of application 146 between devices 102 and/or 140.

In some demonstrative embodiments, controller 124 may cause radio 114 to send a join request message 152 to device 140.

In some demonstrative embodiments, join request message 152 may indicate that device 102 is to request to form the data link group between device 102 and device 140.

In some demonstrative embodiments, join request message 152 may include capability information of device 102.

In some demonstrative embodiments, the capability information of device 102 may indicate one or more connection capabilities of device 102. For example, the capability information of a device, e.g., device 102, may include one or more parameters to establish a connection with the device, e.g., device 102.

In some demonstrative embodiments, device 140 may receive join request message 152 from device 102.

In some demonstrative embodiments, controller 154 may be configured to process join request message 152, e.g., to process the request to form the data link group.

In some demonstrative embodiments, device 140 may send a join response message 154 to device 102.

In some demonstrative embodiments, join response message 154 may indicate if the request to form the data link group is accepted or rejected.

In some demonstrative embodiments, join response message 154 may include capability information of device 140, for example, if the request to form the data link group is accepted.

In some demonstrative embodiments, join response message 154 may include a group identifier of the data link group, for example, if the request to form the data link group is accepted.

In some demonstrative embodiments, device 102 and 140 may from the data link group, for example, if the request to form the data link group is accepted.

In some demonstrative embodiments, devices 102 and/or 140 may be configured to announce the existence of the data link group.

In some demonstrative embodiments, devices 102 and/or 140 may transmit a NAN service discovery frame including the group identifier of the data link group, group availability information corresponding to the data link group, and/or any other information of the data link group.

In some demonstrative embodiments, devices 102 and 140 may communicate data in the data link group including devices 102 and 140, for example, after devices 102 and 140 form the data link group.

In some demonstrative embodiments, devices 102, 115, and/or 140 may be configured to join a data link group. For example, a device of a NAN cluster including devices 102, 115, and/or 140 may be configured to join an existing data link group, which does not include the device, e.g., as described below.

In one example, devices 102 and 140 may belong to a NAN cluster including devices 102, 115, and/or 140, and devices 102 and 140 may form a data link group, e.g., as described above. According to this example, device 115 may be configured to join the data link group formed by devices 102 and 140.

In some demonstrative embodiments, devices 102, 115, and/or 140 may be configured to perform a join procedure, to enable a NAN device, e.g., device 115, to join a NAN data group, e.g., the group formed by devices 102 and 140.

In some demonstrative embodiments, a NAN device ("the requesting NAN device") may discover a NAN data group. For example, the NAN device may discover a data link group configured to provide a service of an application, e.g., gaming application. According to this example, the NAN device may request to join the data link group, for example, if the NAN device wishes to receive the service of and/or to participate in the application.

In some demonstrative embodiments, the NAN device may be configured to transmit a join request frame to a device in the NAN data group ("the grouped NAN device") to request to join to the NAN data group.

In some demonstrative embodiments, the grouped NAN device that receives the join request frame may be configured to respond with a join response frame, which may indicate, for example, whether the request to join the NAN data group is accepted or rejected.

In some demonstrative embodiments, operation information of the NAN data group may be included in the join response frame, for example, if the request to join the NAN data group is accepted.

In some demonstrative embodiments, once the grouped NAN device has sent the join response frame with the indication of acceptance, the grouped NAN device may transmit a group addressed frame ("the new-member notification frame"), e.g., a multicast frame, to the NAN data group, for example, to indicate that a new member, e.g., the requesting NAN device, has joined the data link group.

In some demonstrative embodiments, additionally or alternatively, the requesting NAN device, which has just joined the NAN data group, may indicate that the requesting NAN device joined the group, for example, by transmitting a new-member notification frame to other group members of the data link group, for example, during a time window, which may be agreed among the members in the NAN data group.

In some demonstrative embodiments, the grouped NAN device and the requesting NAN device may be configured to communicate a probe request and a probe response and/or any other frames and/or messages, e.g., to exchange the capability information, e.g., prior to the communication of the join request and/or join response frames.

In some demonstrative embodiments, device 115 may be configured to join a data link group including devices 102 and 140.

In some demonstrative embodiments, device 115 may send a join request message 156 to device 102.

In some demonstrative embodiments, join request message 156 may indicate that device 115 is requesting to join the data link group between device 102 and device 140.

In some demonstrative embodiments, join request message 156 may include the group identifier of the data link group including devices 102 and 140.

In some demonstrative embodiments, device 102 may receive join request message 156 from device 115.

In some demonstrative embodiments, controller 124 may be configured to process the request to join the data link group, for example, by processing join request message 156.

In some demonstrative embodiments, device 102 may send a join response message 158 to device 115.

In some demonstrative embodiments, join response message 158 may indicate if the request to join the data link including devices 102 and 140 is accepted or rejected.

In some demonstrative embodiments, join response message 158 may include the group operation information of the data link group and/or any other information of the data link group, for example, if the request to join the data link group is accepted.

In some demonstrative embodiments, device 102 may be configured to announce that device 115 joined the data link group including device 102 and 140.

In some demonstrative embodiments, device 102 may transmit a new-member announcement 159 to NAN devices of the data link group, for example, if the request of device 115 to join the data link group is accepted. For example, device 102 may transmit the new-member announcement 159 to device 140.

In some demonstrative embodiments, the new-member announcement 159 may include an identifier of device 115, e.g., the MAC address of device 115.

In some demonstrative embodiments, devices 102, 115 and/or 140 may communicate data within the data link group including devices 102, 115 and 140, for example, after device 115 joins the data link group.

In some demonstrative embodiments, devices 102, 115 and/or 140 may be configured to leave a data link group, e.g., as described below.

In some demonstrative embodiments, devices 102, 115 and/or 140 may be configured to perform a leave procedure, which may be configured to enable a NAN device to leave a NAN data link group.

In some demonstrative embodiments, a NAN device may leave a NAN data group. The NAN device may be configured to transmit a frame ("the leaving notification frame"), for example, in the form of a multicast frame, to the group.

In some demonstrative embodiments, the NAN device may leave a group without sending a notification.

In some demonstrative embodiments, device 140 may be configured to transmit a Leaving Notification frame 157, e.g., in the form of a multicast frame, to the data link group including devices 102, 140 and 115, for example, when device 140 is to leave the data link group.

In some demonstrative embodiments, devices 102 and 115 may receive the Leaving Notification frame 157 from device 140, and may be aware that device 140 is to leave the data link group.

In other embodiments, device 140 may leave the data link group including devices 102, 140 and 115, for example, without notifying the other devices of the data link group, e.g., devices 102 and/or 115.

In some demonstrative embodiments, a device of devices 102, 140 and 115, which may belong to a data link group, may be configured to announce to other devices of the data link group an availability of the device to communicate in the data link group.

In some demonstrative embodiments, devices 102, 115 and/or 140 may be configured to perform a keep alive mechanism, which may be configured to enable monitoring, indicating, confirming, verifying, and/or maintaining connectivity between devices of a NAN data group.

In some demonstrative embodiments, a NAN device belonging to a NAN data group may be configured to transmit a keep-alive message, e.g., to other members of the data link group.

In some demonstrative embodiments, a NAN device may be configured to transmit a keep-alive message to the NAN data group, for example, when a Keep-Alive timer expires at the NAN device.

In some demonstrative embodiments, the keep-alive message may include one or more elements of the keep-alive message defined by IEEE 802.11 standards. In some demonstrative embodiments, the keep-alive message may be transmitted, e.g., to members of the NAN data group, for example, as a multicast frame.

In some demonstrative embodiments, transmission of the keep-alive messages may be optional.

In some demonstrative embodiments, device 102 may send a keep-alive message, e.g., as a multicast frame, to a NAN data link group including devices 102, 115 and 140.

In some demonstrative embodiments, devices 115 and/or 140 may receive the keep-alive message, and, for example, may be aware that device 102 is able to communicate with the data link group.

In some demonstrative embodiments, the join request frames, e.g., join request frames 152 and 156, the join response frames, e.g., join response frames 154 and 158, the new member notification frames, e.g., the new member announcement frame 159, and/or the leaving notification frame, e.g., the leave notification frame 157, may include public action frames, for example, dedicated and/or new public action frames.

In one example, the join request frame, the join response frame, the new-member notification frames, and/or the leaving notification frames may be communicated in the form of a dedicated and/or new public action frame, for example, a NAN2 public action frame, e.g., as follows:

TABLE 1

| Field | Size (Octets) | Value (Hex) | Description |
|---|---|---|---|
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | WFA specific OUI |
| OUI Type | 1 | TBD | Identifying the type and version of the NAN2 |
| OUI Subtype | 1 | | Identifying the type of NAN2 Public action frame. The specific value is defined in Table 2. |
| NAN Attributes | Variable | Variable | One or more NAN Attributes |

In some demonstrative embodiments, the Action frame type of the Public Action frame of Table 1 may be set, for example, as follows:

TABLE 2

| Type | Notes |
| --- | --- |
| 0-2 | Reserved |
| 3 | Join Request frame, e.g., as defined in Table 3 |
| 4 | Join Response frame, e.g., as defined in Table 4 |
| 5 | New Member Notification frame, e.g., as defined in Table 5 |
| 6 | Leaving Notification frame, e.g., as defined in Table 6 |
| 6-255 | Reserved |

In one example, a NAN2 Public Action frame may include the Type 3 in the OUI Subtype field, for example, if the NAN2 Public Action frame is a join request frame, e.g., join request 152 and/or 156.

In another example, the NAN2 Public Action frame may include the Type 4 in the OUI Subtype field, for example, if the NAN2 Public Action frame is a join response frame, e.g., join response 154 and/or 158.

In another example, the NAN2 Public Action frame may include the Type 5 in the OUI Subtype field, for example, if the NAN2 Public Action frame is a new-member notification frame, e.g., the new-member announcement 159.

In another example, the NAN2 Public Action frame may include the Type 6 in the OUI Subtype field, for example, if the NAN2 Public Action frame is a leaving notification frame, e.g., leaving notification frame 157.

In some demonstrative embodiments, the Join Request frame may include one or more NAN attributes, for example, a NAN data Group ID, e.g., 6 octets, a MAC address, a Connection Capability, and/or Availability Bitmaps, and/or any other NAN attribute.

In one example, the Join Request Frame may include, for example, one or more fields of the following fields:

TABLE 3

| Field | Size (Octets) | Value (Hex) | Description |
| --- | --- | --- | --- |
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | WFA specific OUI |
| OUI Type | 1 | TBD | Identifying the type and version of the NAN2 |
| OUI Subtype | 1 | 3 | Identifying Join Request frame |
| NAN Data Group ID | 6 | | |
| MAC address | 6 | | |
| Connection Capability | 2 | | |
| Availability Bitmaps | Variable | | |
| Other NAN Attributes | | | |

In one example, device 102 may transmit join request message 152 to device 140, e.g., according to the frame format of Table 3. For example, join request message 152 may include the MAC address of device 102 in the MAC address field of Table 3, the capability information of device 102 in the Connection Capability field of Table 3, and/or the group identifier of the data link group including device 102 and 140 in the NAN Data Group ID field of Table 3.

In some demonstrative embodiments, the Join Response frame may include one or more NAN attributes, for example, a NAN Data Group ID, a Status, e.g., Accepted, Rejected, and the like, one or more NAN Group Operation Availability Bitmaps, and/or any other NAN attribute.

In one example, the Join Response Frame may include, for example, one or more fields of the following fields:

TABLE 4

| Field | Size (Octets) | Value (Hex) | Description |
| --- | --- | --- | --- |
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | WFA specific OUI |
| OUI Type | 1 | TBD | Identifying the type and version of the NAN2 |
| OUI Subtype | 1 | 3 | Identifying Join Response frame |
| NAN Data Group ID | 6 | | |
| Status | 6 | | |
| NAN Group Operation Availability Bitmaps | Variable | | |
| Other NAN Attributes | | | |

In one example, device 140 may transmit join response message 154 to device 140, e.g., according to the frame format of Table 4. For example, the join response message 154 may include the group identifier of the data link group including device 102 and 140 in the NAN Data Group ID field of Table 4, an indication on whether or not the request of device 102 to from the data link group is rejected or accepted in the Status field of Table 4, and/or the group operation information of the data link group including devices 102 and 140 in the NAN Group Operation Availability Bitmaps field of Table 4.

In some demonstrative embodiments, the New Member Notification frame 159 may include, for example, a list of MAC addresses of one or more new members. The New Member Notification frame may include, e.g., optionally, the Connection Capability and/or Availability Bitmaps of the new members.

In one example, the New Member Notification Frame may include, for example, one or more fields of the following fields:

TABLE 5

| Field | Size (Octets) | Value (Hex) | Description |
| --- | --- | --- | --- |
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | WFA specific OUI |
| OUI Type | 1 | TBD | Identifying the type and version of the NAN2 |
| OUI Subtype | 1 | 3 | Identifying New Member Notification frame |
| MAC address | 6 | | New member's MAC address |
| Connection Capability | 2 | | optional |
| Availability Bitmaps | Variable | | optional |
| Other NAN Attributes | | | |

In one example, device 102 may transmit to the data link group including devices 102, 115 and 140 the new member announcement 159, e.g., to announce that device 115 joins the data link group, for example, according to the format of Table 5. For example, the new member announcement 159 may include the MAC address of device 115, e.g., in the MAC address field of Table 5, and, optionally, the capability information of device 115 in the Connection Capability field of Table 5, and/or availability of device 115 in the Availability Bitmaps field of Table 5.

In some demonstrative embodiments, the leaving notification frame 157 may include, for example, a MAC address of the sender of the frame.

In one example, the leaving notification frame may include, for example, one or more fields of the following fields:

TABLE 6

| Field | Size (Octets) | Value (Hex) | Description |
|---|---|---|---|
| Category | 1 | 0x04 | IEEE 802.11 Public Action Frame |
| Action Field | 1 | 0x09 | IEEE 802.11 Public Action Frame Vendor Specific |
| OUI | 3 | 0x50-6F-9A | WFA specific OUI |
| OUI Type | 1 | TBD | Identifying the type and version of the NAN2 |
| OUI Subtype | 1 | 3 | Identifying Leave Notification frame |
| MAC address | 6 | | Transmitting device's MAC address |
| Other NAN Attributes | | | |

In one example, device 140 may transmit the leaving notification frame 157 to the data link group including devices 102, 115 and 140, e.g., to announce that device 140 is to leave the data link group, for example, according to the format of Table 6. For example, the leaving notification frame 157 may include the MAC address of device 140, e.g., in the MAC address field of Table 6.

Figure 2:
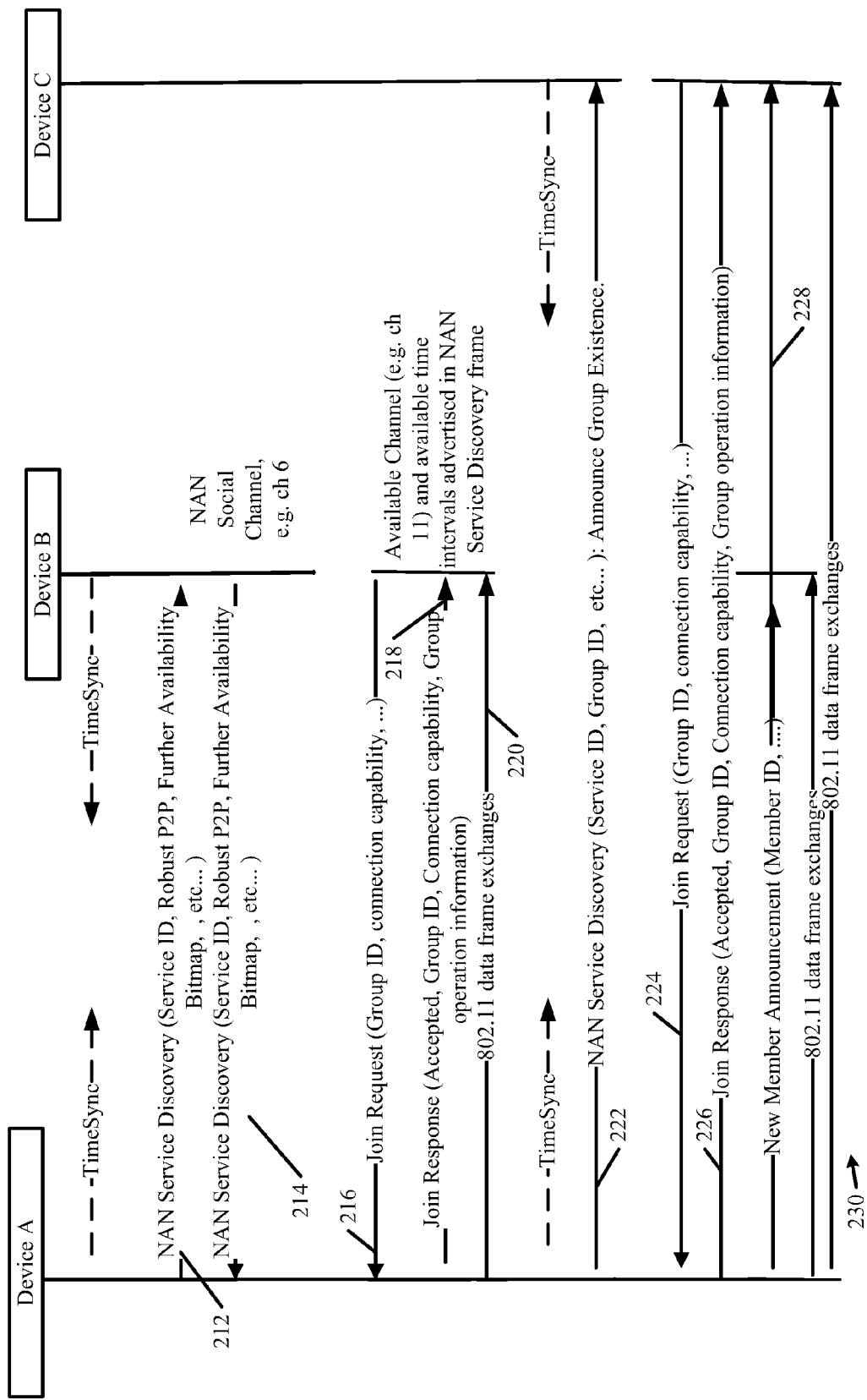
FIG. 2 is a sequence diagram of operations between a plurality of wireless communication devices, in accordance with some demonstrative embodiments.

Reference is made to FIG. 2, which schematically illustrates a sequence diagram of operations between a plurality of wireless communication devices, denoted "Device A", "Device B", and "Device C", in accordance with some demonstrative embodiments. In one example, device 102 (FIG. 1) may perform the functionality of one of Device A, Device B, and Device C; device 115 (FIG. 1) may perform the functionality of another one of Device A, Device B, and Device C; and/or device 140 (FIG. 1) may perform the functionality of another one of Device A, Device B, and Device C.

In some demonstrative embodiments, one or more of the operations of FIG. 2 may be performed, for example, to form a NAN data group, e.g., between Device A and Device B, and/or to join a NAN data group, e.g., to enable Device C to join the group formed by Devices A and B.

As shown in FIG. 2, Device A may transmit a NAN Service Discovery Frame (SDF) 212 to Device B, for example, to enable Device B to discover Device A. For example, device 102 (FIG. 1) may transmit SDF 212 to device 140 (FIG. 1), for example, to enable device 140 to discover device 102 (FIG. 1), e.g., as described above.

As shown in FIG. 2, Device B may transmit a NAN Service Discovery Frame (SDF) 214 to Device A, for example, to enable Device A to discover Device B. For example, device 140 (FIG. 1) may transmit SDF 214 to device 102 (FIG. 1), for example, to enable device 102 to discover device 140 (FIG. 1), e.g., as described above.

As shown in FIG. 2, SDF 212 and/or 214 may be communicated over the social channel, e.g., the Channel 6 in the 2.4 GHz band.

In some demonstrative embodiments, device A may initiate formation of a NAN data link group between Device A and Device B.

As shown in FIG. 2, Device A may transmit a join request frame 216 to Device B, for example, to request to form the NAN data link group between Device A and Device B. For example, device 102 (FIG. 1) may transmit join request frame 216 to device 140 (FIG. 1), for example, to request to form the NAN data link group between devices 140 and 102 (FIG. 1), e.g., as described above.

As shown in FIG. 2, Device B may transmit a join response frame 218 to Device A, for example, to indicate if the request to form the NAN data link group between Device A and Device B is accepted or rejected. For example, device 140 (FIG. 1) may transmit join response frame 218 to device 102 (FIG. 1), for example, to indicate if the request to form the NAN data link group between devices 140 and 102 (FIG. 1) is accepted or rejected, e.g., as described above.

For example, Device B may decide to accept the request to form the NAN data link group between Device A and Device B. According to this example, Device B may set join response message 218 to indicate that the request to form the NAN data link group is accepted.

As shown in FIG. 2, Device A and Device B may exchange data 220 with the data link group, e.g., if the request to from the data link group is accepted and the data link group is formed. For example, devices 102 and 140 (FIG. 1) may communicate data with the NAN data link group between devices 140 and 102 (FIG. 1), e.g., as described above.

As shown in FIG. 2, join request frame 216, join response frame 218, and the exchanging of data 220 may be communicated over an available channel, e.g., channel 11, and during available time slots, as defined in a NAN service discovery frame, e.g., NAN service discovery frames 212 and/or 214.

As shown in FIG. 2, Device A may send an announcement discovery frame 222 to announce that the data link group between Device A and Device B exists. For example, devices 102 and/or 140 (FIG. 1) may send announcement discovery frame 222 to announce that the NAN data link group between devices 140 and 102 (FIG. 1) is formed.

As shown in FIG. 2, Device C may receive announcement discovery frame 222 from Device A and/or Device B. For example, device 115 (FIG. 1) may receive announcement discovery frame 222 from devices 102 and/or 140 (FIG. 1), e.g., as described above.

In some demonstrative embodiments, Device C may request to join the data link group between Devices A and B.

As shown in FIG. 2, Device C may transmit a join request frame 224 to Device A, for example, to request to join the NAN data link group between Device A and Device B. For example, device 115 (FIG. 1) may transmit join request frame 224 to device 102 (FIG. 1), for example, to request to join the NAN data link group between devices 140 and 102 (FIG. 1), e.g., as described above.

As shown in FIG. 2, Device A may transmit a join response frame 226 to Device C, for example, to indicate if the request to join the NAN data link group between Device A and Device B is accepted or rejected. For example, device 102 (FIG. 1) may transmit join response frame 226 to device 115 (FIG. 1), for example, to indicate if the request to join the NAN data link group between devices 140 and 102 (FIG. 1) is accepted or rejected, e.g., as described above.

For example, Device A may decide to accept the request from Device C to join the NAN data link group. According to this example, Device A may set join response message 226 to indicate that the request to join the NAN data link group is accepted.

As shown in FIG. 2, Device A may send a new-member announcement 228 to devices of the data link group, e.g., Device B, to announce that device C joins the data link group between Device A and Device B, for example, if Device A decides to accept the request from Device C to join the NAN data link group. For example, device 102 (FIG. 1) may send new-member announcement 228 to device 140 (FIG. 1) to announce that device 115 (FIG. 1) joins the data link group between devices 140 and 102 (FIG. 1), e.g., as described above.

As shown in FIG. 2, device A, Device B and/or device C may exchange data 230 within the data link group including Devices A, B and C. For example, devices 102, 115 and/or 140 (FIG. 1) may communicate data within the NAN data link group including devices 140, 115 and 102 (FIG. 1), e.g., as described above.

Figure 3:
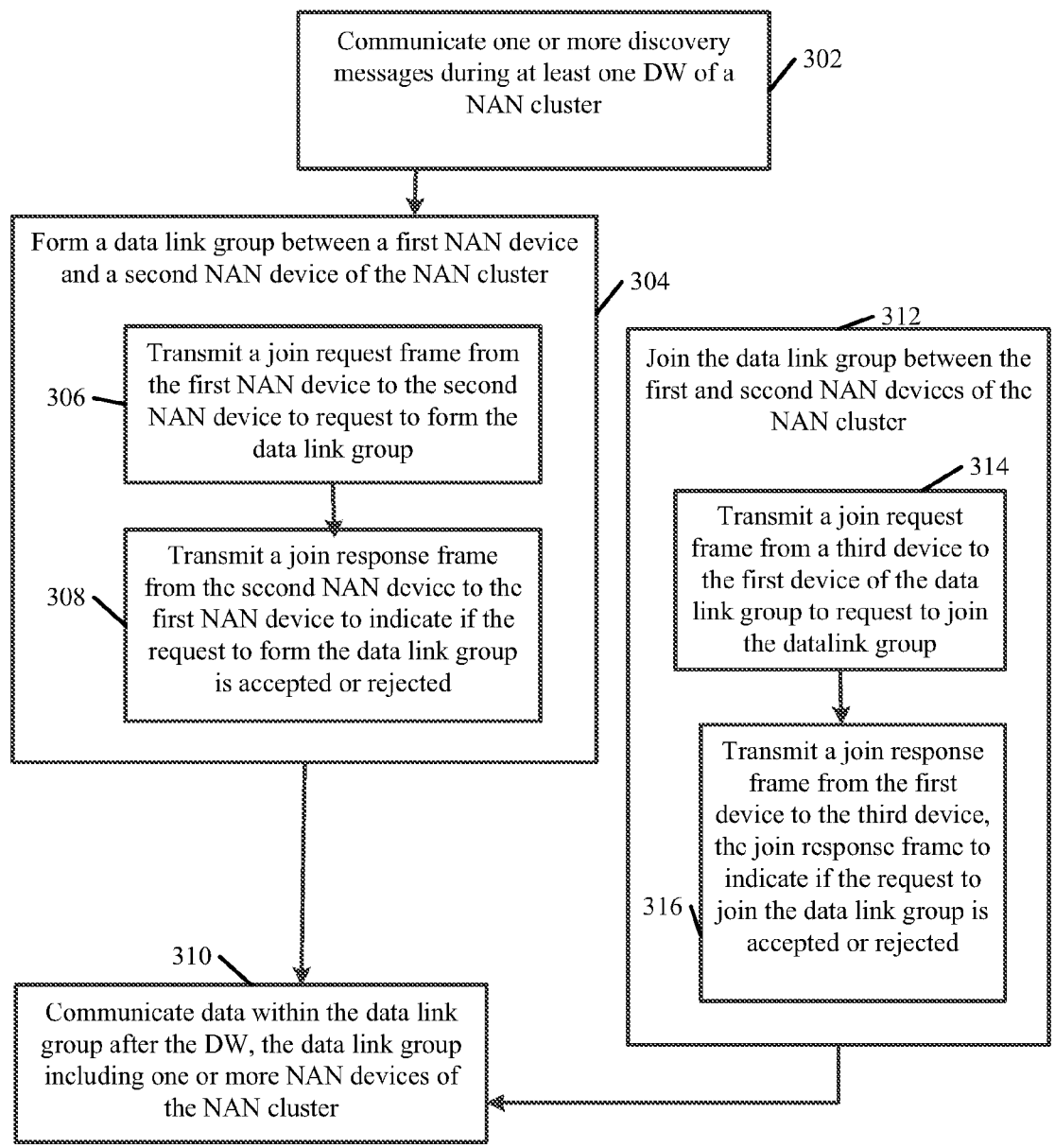
FIG. 3 is a schematic flow-chart illustration of a method of communicating in a data link group, in accordance with some demonstrative embodiments.

Reference is made to FIG. 3, which schematically illustrates a method of communicating in a data link group, in accordance with some demonstrative embodiments. For example, one or more of the operations of the method of FIG. 3 may be performed by a wireless communication system, e.g., system 100 (FIG. 1); a wireless device, wireless devices 102, 140, and/or 115 (FIG. 1); a radio, e.g., radios 114 and/or 154 (FIG. 1); a controller, controllers 124 and/or 154 (FIG. 1); and/or a message processor, e.g., message processors 128 and/or 158 (FIG. 1).

As indicated at block 302, the method may include communicating one or more discovery messages during at least one DW of a NAN cluster. For example, devices 102, 115 and/or 140 (FIG. 1) may communicate the one or more discovery messages during the one or more DWs of the NAN cluster including 102, 115 and/or 140 (FIG. 1), e.g., as described above.

As indicated at block 304, the method may include forming a data link group between a first NAN device and a second NAN device of the NAN cluster. For example, device 102 (FIG. 1) may form a data link group between device 102 and device 140 (FIG. 1), e.g., as described above.

As indicated at block 306, forming the data link group may include transmitting a join request frame from the first NAN device to the second NAN device to request to form the data link group. For example, device 102 (FIG. 1) may transmit join request message 152 (FIG. 1) to device 140 (FIG. 1), e.g., as described above.

As indicated at block 308, forming the data link group may include transmitting a join response frame from the second NAN device to the first NAN device, the join response frame to indicate if the request to form the data link group is accepted or rejected. For example, device 140 (FIG. 1) may transmit join response message 154 (FIG. 1) to device 102 (FIG. 1), e.g., as described above.

As indicated at block 310, the method may include communicating data within the data link group after the DW, the data link group including one or more NAN devices of the NAN cluster. For example, devices 102 and/or 140 (FIG. 1) may communicate with the data link group including devices 102 and 140 (FIG. 1), e.g., as described above.

As indicated at block 312, the method may include joining the data link group between the first and second NAN devices of the NAN cluster. For example, device 115 (FIG. 1) may join the data link group between device 102 and 140 (FIG. 1), e.g., as described above.

As indicated at block 306, joining the data link group may include transmitting a join request frame from a third device to the first device of the data link group to request to join the data link group. For example, device 115 (FIG. 1) may transmit join request message 156 (FIG. 1) to device 102 (FIG. 1) to request to join the data link group between device 102 and 140 (FIG. 1), e.g., as described above.

As indicated at block 308, joining the data link group may include transmitting a join response frame from the first device to the third device, the join response frame to indicate if the request to join the data link group is accepted or rejected. For example, device 102 (FIG. 1) may transmit join response message 158 (FIG. 1) to device 115 (FIG. 1), e.g., as described above.

Figure 4:
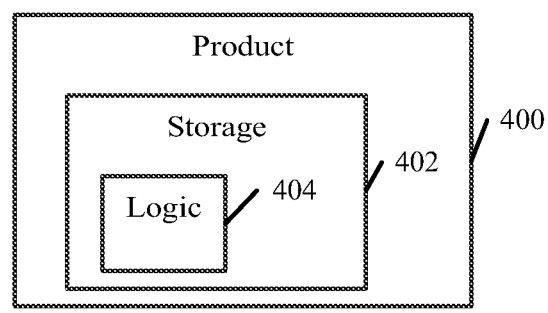
FIG. 4 is a schematic illustration of a product, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of devices 102 (FIG. 1), device 115, and/or 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 (FIG. 1) and/or 158 (FIG. 1), and/or to perform one or more operations described above with reference to FIGS. 2 and/or 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a Neighbor Awareness Networking (NAN) device to communicate one or more discovery messages during at least one Discovery Window (DW) of a NAN cluster including the NAN device; and communicate data within a data link group after the DW, the data link group including the NAN device and one or more NAN devices of the NAN cluster.

Example 2 includes the subject matter of Example 1, and optionally, wherein the apparatus being configured to cause the NAN device to form the data link group between the NAN device and another NAN device of the NAN cluster.

Example 3 includes the subject matter of Example 2, and optionally, wherein the apparatus being configured to cause the NAN device to send a Join request message to the another NAN device.

Example 4 includes the subject matter of Example 3, and optionally, wherein the join request message comprises capability information of the NAN device.

Example 5 includes the subject matter of any one of Examples 1-4, and optionally, wherein the apparatus being configured to cause the NAN device to join the data link group.

Example 6 includes the subject matter of any one of Examples 1-5, and optionally, wherein the apparatus being configured to cause the NAN device to leave the data link group.

Example 7 includes the subject matter of any one of Examples 1-6, and optionally, wherein the apparatus being configured to cause the NAN device to process a join request message from another NAN device of the NAN cluster, the join request message to request to join the data link group, and to transmit to the another NAN device of the NAN cluster a join response message indicating if the request to join the data link group is accepted or rejected.

Example 8 includes the subject matter of Example 7, and optionally, wherein the join response message comprises a group identifier of the data link group when the request to join the data link group is accepted.

Example 9 includes the subject matter of Example 7 or 8, and optionally, wherein the join response message comprises capability information of the NAN device, and the join request message includes capability information of the another NAN device.

Example 10 includes the subject matter of any one of Examples 7-9, and optionally, wherein the apparatus being configured to cause the NAN device to, if the request to join the data link group is accepted, transmit a new-member announcement to NAN devices of the data link group.

Example 11 includes the subject matter of Example 10, and optionally, wherein the new-member announcement includes a Media Access Control (MAC) address of the another NAN device.

Example 12 includes the subject matter of any one of Examples 1-11, and optionally, comprising a radio to communicate the one or more discovery messages during the at least one DW, and to communicate the data.

Example 13 includes the subject matter of any one of Examples 1-12, and optionally, comprising one or more antennas, a memory, and a processor.

Example 14 includes a system comprising a Neighbor Awareness Networking (NAN) device, the NAN device comprising one or more antennas; a memory; a processor; and a radio to communicate one or more discovery messages during at least one Discovery Window (DW) of a NAN cluster including the NAN device, and to communicate data within a data link group after the DW, the data link group including the NAN device and one or more NAN devices of the NAN cluster.

Example 15 includes the subject matter of Example 14, and optionally, wherein the NAN device is to form the data link group between the NAN device and another NAN device of the NAN cluster.

Example 16 includes the subject matter of Example 15, and optionally, wherein the radio is to send a Join request message to the another NAN device.

Example 17 includes the subject matter of Example 16, and optionally, wherein the join request message comprises capability information of the NAN device.

Example 18 includes the subject matter of any one of Examples 14-17, and optionally, wherein the NAN device is to join the data link group.

Example 19 includes the subject matter of any one of Examples 14-18, and optionally, wherein the NAN device is to leave the data link group.

Example 20 includes the subject matter of any one of Examples 14-19, and optionally, wherein the NAN device is to process a join request message from another NAN device of the NAN cluster, the join request message to request to join the data link group, the radio is to transmit to the another NAN device of the NAN cluster a join response message indicating if the request to join the data link group is accepted or rejected.

Example 21 includes the subject matter of Example 20, and optionally, wherein the join response message comprises a group identifier of the data link group when the request to join the data link group is accepted.

Example 22 includes the subject matter of Example 20 or 21, and optionally, wherein the join response message comprises capability information of the NAN device, and the join request message includes capability information of the another NAN device.

Example 23 includes the subject matter of any one of Examples 20-22, and optionally, wherein, if the request to join the data link group is accepted, the radio is to transmit a new-member announcement to NAN devices of the data link group.

Example 24 includes the subject matter of Example 23, and optionally, wherein the new-member announcement includes a Media Access Control (MAC) address of the another NAN device.

Example 25 includes a method to be performed at a Neighbor Awareness Networking (NAN) device, the method comprising communicating one or more discovery messages during at least one Discovery Window (DW) of a NAN cluster including the NAN device; and communicating data within a data link group after the DW, the data link group including the NAN device and one or more NAN devices of the NAN cluster.

Example 26 includes the subject matter of Example 25, and optionally, comprising forming the data link group between the NAN device and another NAN device of the NAN cluster.

Example 27 includes the subject matter of Example 26, and optionally, comprising sending a Join request message to the another NAN device.

Example 28 includes the subject matter of Example 27, and optionally, wherein the join request message comprises capability information of the NAN device.

Example 29 includes the subject matter of any one of Examples 25-28, and optionally, comprising joining the data link group.

Example 30 includes the subject matter of any one of Examples 25-29, and optionally, comprising leaving the data link group.

Example 31 includes the subject matter of any one of Examples 25-30 comprising processing a join request message from another NAN device of the NAN cluster, the join request message to request to join the data link group, and transmitting to the another NAN device of the NAN cluster a join response message indicating if the request to join the data link group is accepted or rejected.

Example 32 includes the subject matter of Example 31, and optionally, wherein the join response message comprises a group identifier of the data link group when the request to join the data link group is accepted.

Example 33 includes the subject matter of Example 31 or 32, and optionally, wherein the join response message comprises capability information of the NAN device, and the join request message includes capability information of the another NAN device.

Example 34 includes the subject matter of any one of Examples 31-33, and optionally, comprising transmitting a new-member announcement to NAN devices of the data link group, if the request to join the data link group is accepted.

Example 35 includes the subject matter of Example 34, and optionally, wherein the new-member announcement includes a Media Access Control (MAC) address of the another NAN device.

Example 36 includes a product including one or more tangible computer-readable non-transitory storage media comprising computer-executable instructions operable to, when executed by at least one computer processor, enable the at least one computer processor to implement a method at a Neighbor Awareness Networking (NAN) device, the method comprising communicating one or more discovery messages during at least one Discovery Window (DW) of a NAN cluster including the NAN device; and communicating data within a data link group after the DW, the data link group including the NAN device and one or more NAN devices of the NAN cluster.

Example 37 includes the subject matter of Example 36, and optionally, wherein the method comprises forming the data link group between the NAN device and another NAN device of the NAN cluster.

Example 38 includes the subject matter of Example 37, and optionally, wherein the method comprises sending a Join request message to the another NAN device.

Example 39 includes the subject matter of Example 38, and optionally, wherein the join request message comprises capability information of the NAN device.

Example 40 includes the subject matter of any one of Examples 36-39, and optionally, wherein the method comprises joining the data link group.

Example 41 includes the subject matter of any one of Examples 36-40, and optionally, wherein the method comprises leaving the data link group.

Example 42 includes the subject matter of any one of Examples 36-41, and optionally, wherein the method comprises processing a join request message from another NAN device of the NAN cluster, the join request message to request to join the data link group, and transmitting to the another NAN device of the NAN cluster a join response message indicating if the request to join the data link group is accepted or rejected.

Example 43 includes the subject matter of Example 42, and optionally, wherein the join response message comprises a group identifier of the data link group when the request to join the data link group is accepted.

Example 44 includes the subject matter of Example 42 or 43, and optionally, wherein the join response message comprises capability information of the NAN device, and the join request message includes capability information of the another NAN device.

Example 45 includes the subject matter of any one of Examples 42-44, and optionally, wherein the method comprises transmitting a new-member announcement to NAN devices of the data link group, if the request to join the data link group is accepted.

Example 46 includes the subject matter of Example 42, and optionally, wherein the new-member announcement includes a Media Access Control (MAC) address of the another NAN device.

Example 47 includes an apparatus of wireless communication, the apparatus comprising means for communicating by a Neighbor Awareness Networking (NAN) device one or more discovery messages during at least one Discovery Window (DW) of a NAN cluster including the NAN device; and means for communicating data within a data link group after the DW, the data link group including the NAN device and one or more NAN devices of the NAN cluster.

Example 48 includes the subject matter of Example 47, and optionally, comprising means for forming the data link group between the NAN device and another NAN device of the NAN cluster.

Example 49 includes the subject matter of Example 48, and optionally, comprising means for sending a Join request message to the another NAN device.

Example 50 includes the subject matter of Example 49, and optionally, wherein the join request message comprises capability information of the NAN device.

Example 51 includes the subject matter of any one of Examples 47-50, and optionally, comprising means for joining the data link group.

Example 52 includes the subject matter of any one of Examples 47-51, and optionally, comprising means for leaving the data link group.

Example 53 includes the subject matter of any one of Examples 47-52 comprising means for processing a join request message from another NAN device of the NAN cluster, the join request message to request to join the data link group, and transmitting to the another NAN device of the NAN cluster a join response message indicating if the request to join the data link group is accepted or rejected.

Example 54 includes the subject matter of Example 53, and optionally, wherein the join response message comprises a group identifier of the data link group when the request to join the data link group is accepted.

Example 55 includes the subject matter of Example 53 or 54, and optionally, wherein the join response message comprises capability information of the NAN device, and the join request message includes capability information of the another NAN device.

Example 56 includes the subject matter of any one of Examples 53-55, and optionally, comprising means for transmitting a new-member announcement to NAN devices of the data link group, if the request to join the data link group is accepted.

Example 57 includes the subject matter of Example 56, and optionally, wherein the new-member announcement includes a Media Access Control (MAC) address of the another NAN device.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising a memory, and a processor configured to cause a first Neighbor Awareness Networking (NAN) device to:
   transmit a NAN Service Discovery Frame (SDF) to announce a multicast group of two or more NAN devices to communicate multicast traffic of a service, the multicast group comprising the first NAN device;
   process a first NAN action frame from a second NAN device, the first NAN action frame comprising a first attribute type to indicate a request to join the multicast group; and
   transmit a second NAN action frame to the second NAN device, the second NAN action frame comprising a second attribute type to indicate a response, and a status field to indicate whether the request to join the multicast group is accepted or rejected, the second NAN action frame comprising a group identifier (ID) of the multicast group when the request to join the multicast group is accepted.

2. The apparatus of claim 1, wherein, when the request to join the multicast group is accepted, the second NAN action frame comprises group availability information to indicate one or more time slots and a channel to communicate in the multicast group.

3. The apparatus of claim 1, wherein, when the request to join the multicast group is accepted, the second NAN action frame comprises a NAN availability attribute corresponding to the multicast group.

4. The apparatus of claim 1, wherein the first NAN action frame comprises a NAN availability attribute corresponding to the second NAN device.

5. The apparatus of claim 1 configured to cause the first NAN device to generate a group key to encrypt communications within the multicast group.

6. The apparatus of claim 1 configured to cause the first NAN device to transmit the NAN SDF during a Discovery Window (DW).

7. The apparatus of claim 1 configured to cause the first NAN device to communicate a multicast transmission with the multicast group.

8. The apparatus of claim 1 comprising Medium Access Control (MAC) logic, and Physical Layer (PHY) logic.

9. The apparatus of claim 1 comprising a radio.

10. The apparatus of claim 1 comprising one or more antennas.

11. A product comprising one or more tangible computer-readable non-transitory storage media comprising computer-executable instructions operable to, when executed by at least one processor, enable the at least one processor to cause a first Neighbor Awareness Networking (NAN) device to:
    transmit a NAN Service Discovery Frame (SDF) to announce a multicast group of two or more NAN devices to communicate multicast traffic of a service, the multicast group comprising the first NAN device;
    process a first NAN action frame from a second NAN device, the first NAN action frame comprising a first attribute type to indicate a request to join the multicast group; and
    transmit a second NAN action frame to the second NAN device, the second NAN action frame comprising a second attribute type to indicate a response, and a status field to indicate whether the request to join the multicast group is accepted or rejected, the second NAN action frame comprising a group identifier (ID) of the multicast group when the request to join the multicast group is accepted.

12. The product of claim 11, wherein, when the request to join the multicast group is accepted, the second NAN action frame comprises group availability information to indicate one or more time slots and a channel to communicate in the multicast group.

13. The product of claim 11, wherein, when the request to join the multicast group is accepted, the second NAN action frame comprises a NAN availability attribute corresponding to the multicast group.

14. The product of claim 11, wherein the first NAN action frame comprises a NAN availability attribute corresponding to the second NAN device.

15. The product of claim 11, wherein the instructions, when executed, cause the first NAN device to generate a group key to encrypt communications within the multicast group.

16. The product of claim 11, wherein the instructions, when executed, cause the first NAN device to transmit the NAN SDF during a Discovery Window (DW).

17. The product of claim 11, wherein the instructions, when executed, cause the first NAN device to communicate a multicast transmission with the multicast group.

18. An apparatus comprising a memory, and a processor configured to cause a first Neighbor Awareness Networking (NAN) device to:
    process a NAN Service Discovery Frame (SDF) from a second NAN device, the NAN SDF to announce a multicast group of two or more NAN devices to communicate multicast traffic of a service;
    transmit a first NAN action frame to the second NAN device, the first NAN action frame comprising a first attribute type to indicate a request to join the multicast group; and
    process a second NAN action frame from the second NAN device, the second NAN action frame comprising a second attribute type to indicate a response, and a status field to indicate whether the request to join the multicast group is accepted or rejected, the second NAN action frame comprising a group identifier (ID) of the multicast group when the request to join the multicast group is accepted.

19. The apparatus of claim 18, wherein, when the request to join the multicast group is accepted, the second NAN action frame comprises group availability information to indicate one or more time slots and a channel to communicate in the multicast group.

20. The apparatus of claim 18, wherein, when the request to join the multicast group is accepted, the second NAN action frame comprises a NAN availability attribute corresponding to the multicast group.

21. The apparatus of claim 18, wherein the first NAN action frame comprises a NAN availability attribute corresponding to the first NAN device.

22. The apparatus of claim 18 configured to cause the first NAN device to, when the request to join the multicast group is accepted, communicate a multicast transmission with the multicast group.

23. The apparatus of claim 18 configured to cause the first NAN device to encrypt communication within the multicast group.

24. The apparatus of claim 18 configured to cause the first NAN device to receive the NAN SDF during a Discovery Window (DW).

25. The apparatus of claim 18 comprising Medium Access Control (MAC) logic, and Physical Layer (PHY) logic.

26. The apparatus of claim 18 comprising a radio.

27. The apparatus of claim 18 comprising one or more antennas.

28. A product comprising one or more tangible computer-readable non-transitory storage media comprising computer-executable instructions operable to, when executed by at least one processor, enable the at least one processor to cause a first Neighbor Awareness Networking (NAN) device to:

process a NAN Service Discovery Frame (SDF) from a second NAN device, the NAN SDF to announce a multicast group of two or more NAN devices to communicate multicast traffic of a service;

transmit a first NAN action frame to the second NAN device, the first NAN action frame comprising a first attribute type to indicate a request to join the multicast group; and process a second NAN action frame from the second NAN device, the second NAN action frame comprising a second attribute type to indicate a response, and a status field to indicate whether the request to join the multicast group is accepted or rejected, the second NAN action frame comprising a group identifier (ID) of the multicast group when the request to join the multicast group is accepted.

29. The product of claim 28, wherein, when the request to join the multicast group is accepted, the second NAN action frame comprises group availability information to indicate one or more time slots and a channel to communicate in the multicast group.

30. The product of claim 28, wherein, when the request to join the multicast group is accepted, the second NAN action frame comprises a NAN availability attribute corresponding to the multicast group.

31. The product of claim 28, wherein the first NAN action frame comprises a NAN availability attribute corresponding to the first NAN device.

32. The product of claim 28, wherein the instructions, when executed, cause the first NAN device to, when the request to join the multicast group is accepted, communicate a multicast transmission with the multicast group.

33. The product of claim 28, wherein the instructions, when executed, cause the first NAN device to encrypt communication within the multicast group.

34. The product of claim 28, wherein the instructions, when executed, cause the first NAN device to receive the NAN SDF during a Discovery Window (DW).

\* \* \* \* \*